United States Patent [19]
Latinen, deceased

[11] 3,781,132
[45] Dec. 25, 1973

[54] DEVOLATILIZER ROTOR ASSEMBLY

[75] Inventor: George A. Latinen, deceased, late of Springfield, Mass. by May V. Latinen, administratrix

[73] Assignee: Monsanto Company, St. Louis, Mo.

[22] Filed: Aug. 16, 1971

[21] Appl. No.: 172,187

[52] U.S. Cl. .............................. 416/200, 259/191
[51] Int. Cl. ........................................... F04d 29/18
[58] Field of Search ............... 416/198, 200; 233/3, 233/7; 259/7–10, 191

[56] References Cited
UNITED STATES PATENTS

| | | | |
|---|---|---|---|
| 2,213,381 | 9/1940 | Brown | 259/6 |
| 3,224,929 | 12/1965 | Fair | 259/6 X |
| 3,570,588 | 3/1971 | Wheeler | 259/9 X |
| 3,535,737 | 10/1970 | Hendry | 259/191 |
| 3,224,929 | 12/1965 | Fair | 416/200 |
| 37,214 | 12/1862 | Brinkerhoff | 416/200 |
| 1,391,057 | 9/1921 | Holmstrom | 416/200 |
| | 9/1827 | Skinner | 416/200 |

Primary Examiner—Carlton H. Croyle
Assistant Examiner—Robert E. Garrett
Attorney—Edward P. Grattan

[57] ABSTRACT

A rotor assembly suitable for use in a devolatilizer for processing relatively viscous materials to separate volatiles therefrom is described. The rotor assembly permits a high mechanical energy input to materials being treated, has low surging characteristics, and permits operating at relatively high speeds with low foaming tendencies. The rotor assembly employs a plurality of circumferentially positioned, radially projecting, plow blades arranged about a central shaft into a plurality of axially extending rows. The total blade land surface areas of the individual plow blades is controlled, as is the rotor assembly length to diameter ratio.

6 Claims, 7 Drawing Figures

PATENTED DEC 25 1973

INVENTOR.
GEORGE A. LATINEN
BY
John W. Klooster
ATTORNEY

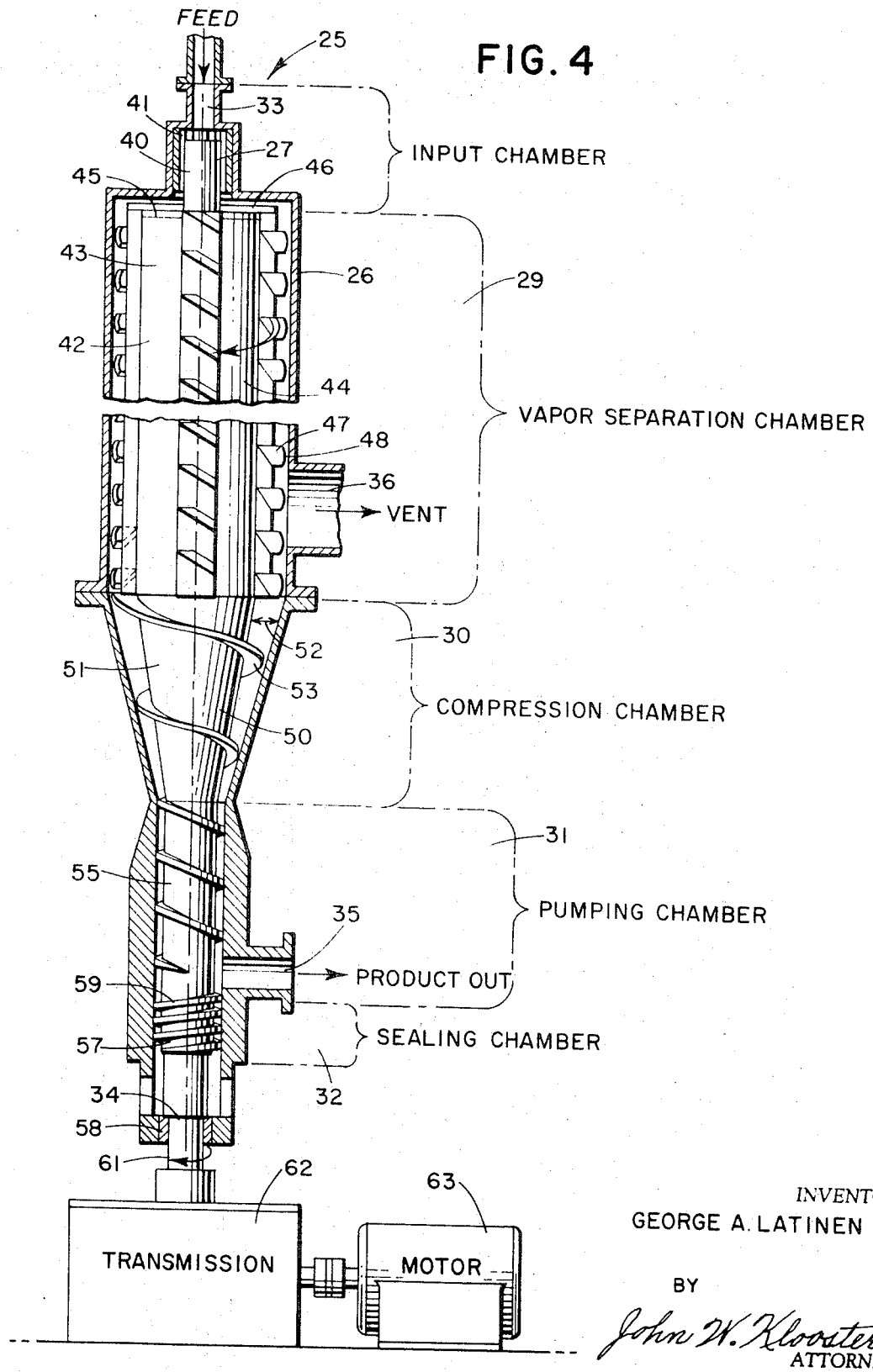

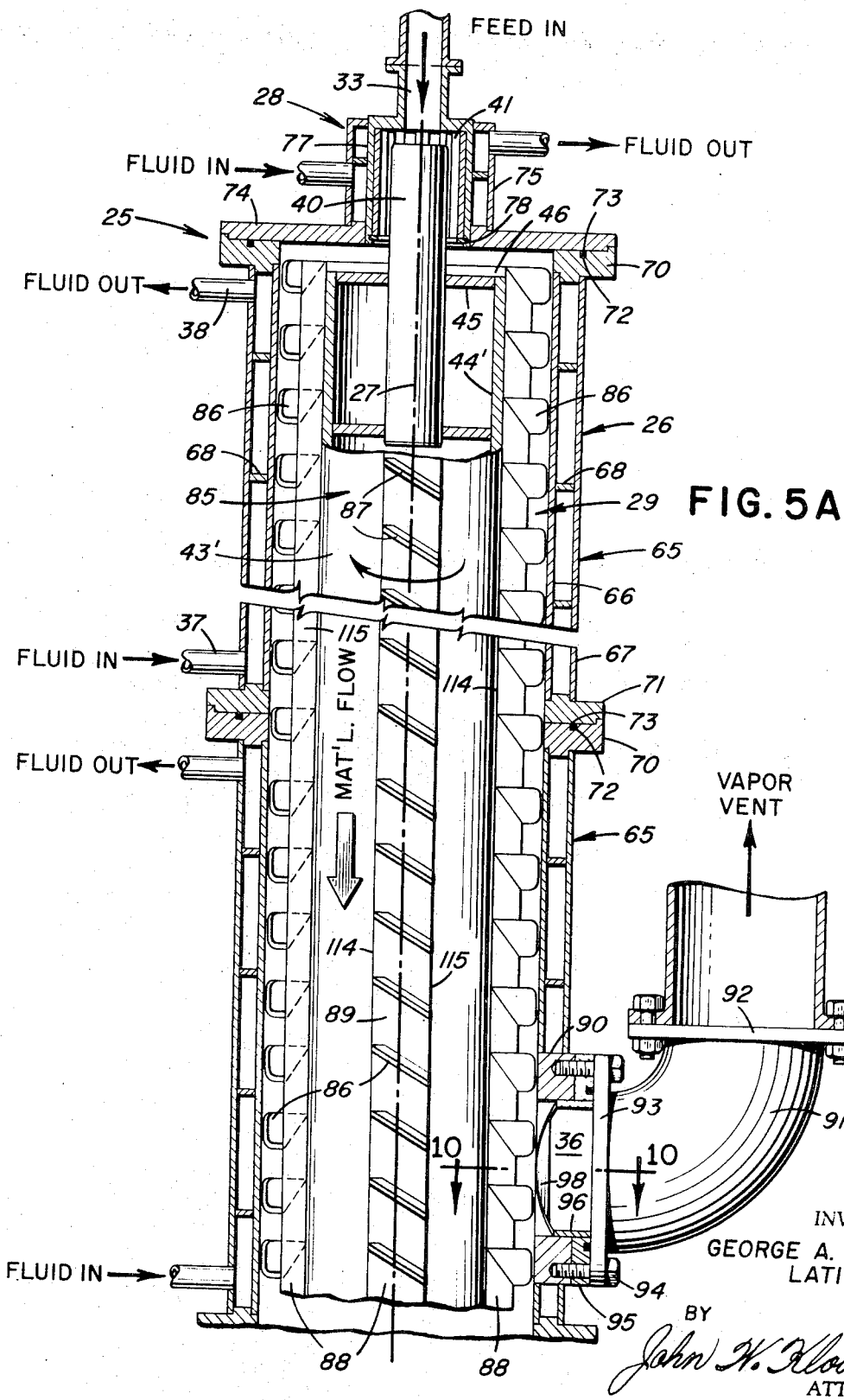

DEVOLATILIZER ROTOR ASSEMBLY

BACKGROUND

Wiped film devolatilizers of the type employed to separate a relatively volatile material from a relatively non-volatile material function by transporting a mixture of such volatile and non-volatile materials into and through a separation chamber wherein conditions are maintained at such elevated temperatures and reduced pressures that the volatile material is above its boiling point, permitting separation of such volatile material in a vapor phase from the non-volatile material. In such transporting, a wiped film devolatilizer utilizes a rotor assembly which axially revolves in such separation chamber and which operates to move material axially therethrough and also simultaneously to spread material in the form of a thin film over inside chamber surfaces.

A number of different constructions for devolatilizers of the wiped film type are already known to the art, but it is a general fact that, in all such devices, the rotor assembly employed therein has a profound influence on operating and performance characteristics. Such factors as rotor blade land area, contact angle, rotor shaft speed, and the like, can be critical. The effectiveness of a rotor assembly in the separation chamber of a given devolatilizer is judged by such factors as the amount of mechanical energy transferred from rotor assembly to material being processed, amount of material surface area generated per unit of time and per unit of axial distance (surface area being critical to separation of volatile from non-volatile material), capacity to move material through the separation chamber smoothly with minimum surging or foaming, and the like.

Rotor assemblies heretofore known have characteristically transferred to a material being processed only very little mechanical energy, so that at least about 80% of the thermal energy heretofore used in the separation chamber was transferred thereinto from the chamber walls, the walls themselves being jacketed for this prupose. Typically, such prior art rotor assemblies only moved material axially and spread same over inside surfaces of the separation chamber.

There has now been discovered, however, a construction for a rotor assembly which permits one to accomplish a high energy transfer from assembly being processed in a separation chamber. Furthermore, this construction enhances vapor separation in a separation chamber as well as surface area generation, thereby increasing operational efficiency of devolatilization. This rotor assembly construction is well suited for cocurrent, as opposed to counter-current, flow of separated vapor to material being processed in a separation chamber.

SUMMARY

The present invention is directed to a type of rotor assembly adapted for use in the separation chamber of a wiped film devolatilizer, and is particularly suitable for devolatilizing relatively viscous materials. In this rotor assembly, the blades are formed by a plurality of plow-like individual members which are arranged in axially extending rows on circumferential side wall portions of a main, centrally located rotor shaft means. The blade-like members are positioned and constructed to exert axial and circumferential force vectors on all regions radially located adjacent the rotor assembly as it rotates on its axis. In this rotor assembly, the ratio of the sum of the surface areas of all circumferential land portions of the blade-like members to the cylindrical, circumferential region swept by the land portions is controlled, the ratio of rotor shaft diameter to diameter of the cylindrical region swept by the land portions is controlled, the ratio of the axial length of a row to the diameter of the cylindrical region swept by the land portions is controlled, and the shaft angle subtended by a row is less than or equal to the shaft angle subtended by space between adjacent rows.

DRAWINGS

The present invention is better understood by reference to the appended drawings wherein:

FIG. 4 is a diagrammatic representation in longitudinal section of a wiped film devolatilizer construction wherein a rotor assembly of this invention is employed;

FIGS. 5A and 5B show a detailed longitudinal sectional view through the embodiment shown in FIG. 4. FIG. 5A showing the upper portion of such embodiment, FIG. 5B showing the lower portion thereof, some parts broken away and some parts shown in section.

Figure 1:
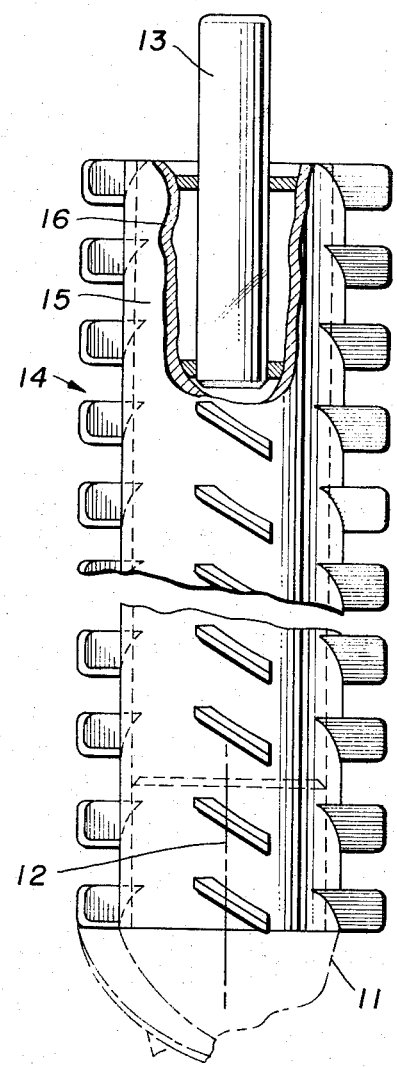
FIG. 1 is a representation in side elevation of an embodiment of a rotor assembly of this invention.
Figure 2:
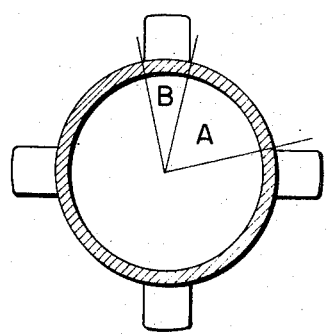
FIG. 2 is a vertical sectional view through the embodiment of FIG. 1.
Figure 3:
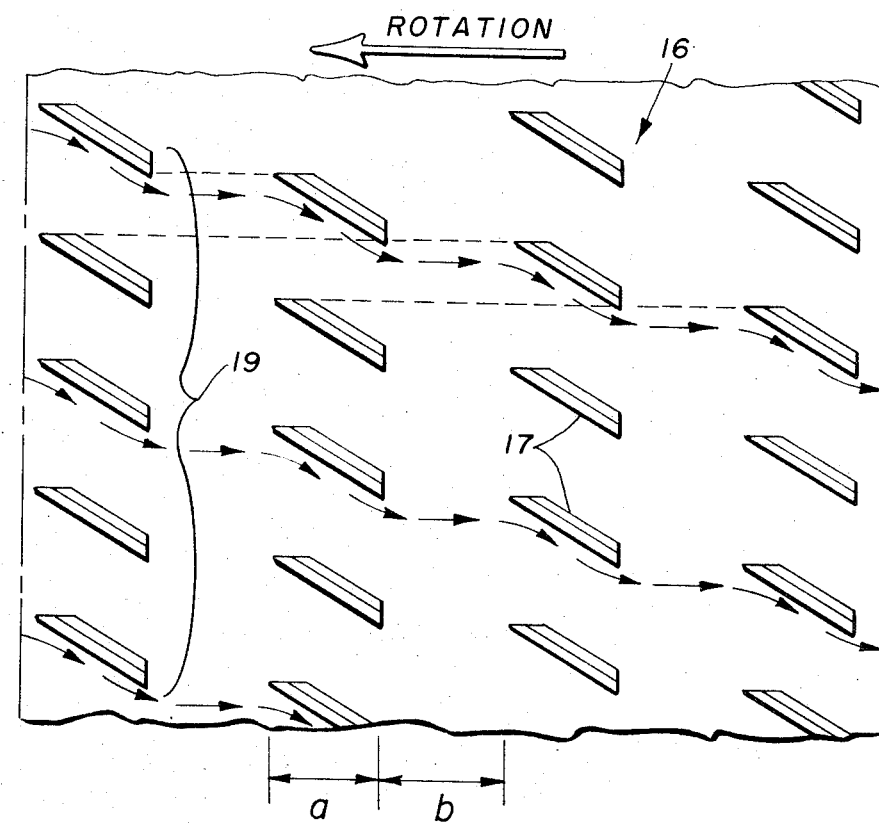
FIG. 3 is a developed view of a fragment of the circumferential cylindrical surface of the completed rotor assembly of FIG. 1.

Illustrated in FIGS. 1—3 are constructional principles utilized in an embodiment of a rotor assembly of the present invention, such assembly being herein designated in its entirety by the numeral 14. Rotor assembly 14 is utilizied in a separation chamber of a devolatilizer (not shown in FIG. 1 but see FIGS. 5A and 5B). Rotor assembly 14 employs a rotably mountable shaft means 15 which has generally cylindrical side wall portions 16.

Since the diameter of a shaft means 15 is, or can be, relatively large in an industrial scale rotor assembly 14, it is common and expeditious to construct shaft means 15 as a hollow tube except at the opposite ends thereof. Thus, at the end thereof chosen to be the input end, a solid smaller diamter shaft 13 may be secured coaxially with the axis 12 of rotor assembly 14, while at the output end, the base or enlarged end portion of a frustroconical shaft section 11 of a compression screw shaft, may be secured coaxially with axis 12, thereby fitting rotor assembly 14 for use, for example, in a devolatizer of the type shown in FIGS. 4-6 described below.

A plurality of radially outwardly extending blade-like or plow-like members 17 are mounted as by welding or the like on side wall portion 16, as by welding or the like. Each such blade-like member 17 extends circumferentially along portion 16 at an angle typically ranging from about 15° to 85° (preferably 30° to 55°) with respect to the axis 12 of rotor assembly 14, all such members 17 having a similar inclination or slope relative to axis 12. The exact angle for blade member 17 in any given rotor assembly 14 being a matter of individual choice or preference. All such blade-like members 17 are arranged into four axially extending, circumferentially spaced, parallel rows 19, though any convenient number of rows from to about 8 can be employed if desired. Each row 19 contains about, though not necessarily exactly, the same respective number of members 17. In each row 19, the members 17 are axially spaced from one another, preferably equally as shown, and all the members 17 in any given row 19 are preferably equally sized and inclined.

Each individual blade-like member 17, in the embodiment shown, is flattened but it will be appreciated that an individual member 17 may be curved. Each blade-like member 17 has at least one land portion 18 defined on its circumferentially located, radial outer edge. The circumferentially located, radial outer edge section comprising such land portion 18 is substantially equally radially spaced from axis 12, but generally can have any desired cross-sectional configuration. Optionally, the leading (relative to the direction of rotation of shaft means 15), radially located edge section of a blade-like member 17 can be considered to be, and can be formed into, an extension of a land portion 18. For purposes of the present invention, no particular criticality or novelty is associated with construction, configuration, or location of individual blade-like members 17 on a shaft means 15. It is presently preferred to have all blade-like members 17 on a given shaft means 15 in a given rotor assembly 14 be similar to one another. Conventional blade designs can be utilized as those skilled in the art will readily appreciate.

In general, as shown by FIG. 2, all the blade-like members on any one shaft means 15 are so positioned relative to the other blade-like members 17 that all cylindrical regions circumferentially located radially opposite shaft means 15 are, or would be, swept by at least one of such land portions 18 during one revolution of a rotor assembly 14 on axis 2. For some applications, all blade-like members 17 on a given shaft means 15 are substantially parallel to one another. However, it may frequently be desirable to use, in a given rotor assembly, blades of different size, angular orientation, or land area at different axial locations along the rotor in a separation chamber to achieve a desired vapor separation or material forwarding action or energy transfer at points along the axial lengths of a rotor assembly, as those skilled in the art will readily appreciate.

Preferably, in a rotor assembly 14, the ratio of the sum of the surface areas of all land portions 18 in assembly 14 to the total cylindrical surface area swept by a rotor assembly 14 in one revolution thereof ranges from about 0.003 to 1 to 0.05 to 1. Particular criticality is associated with the various individual elements, the dimensions thereof, or the interrelationship of such to other such elements employed in a given rotor assembly 14 for purposes of the present invention.

Each blade-like member 17 has a land portion 18 defined at its radial outer, circumferentially located edge. Each land portion 18 is substantially equally radially spaced from axis 12 and is adapted to apply both an axial and a circumferential force vector when the rotor assembly 14 revolves on axis 12.

All the blade-like members 17 are so arranged on side wall portions 16 that the end of one land portion 18 of one blade-like member 17 in one row 19 generally either meets or overlaps less than 100 percent upon the beginning of a land portion 18 on another blade-like member 17 in the next adjacent row 19 measured circumferentially in the direction of rotation of rotor assembly 14 on axis 12. This promotes a continuous movement of melt through the devolatilizer in the direction of the compression chamber 30 (see FIG. 4).

The ratio of the sum of the surface areas of all land portions 18 to the sum of all circumferential regions radially adjacent rotor assembly 14 swept by the land portions 18 in one revolution of rotor assembly 14 (that is, the total surface area of the cylindrical region about a rotor assembly 14) ranges from about 0.003 to 1 to 0.15 to 1, and preferably from about 0.005 to 1 to 0.08 to 1. Also, the ratio of the diameter of shaft means 15 to the diameter of the circumferential regions radially adjacent rotor assembly 14 (that is, the effective outside diameter of rotor assembly 14) ranges from about 0.2 to 1 to 0.95 to 1, and preferably from about 0.6 to 1 to 0.9 to 1. Further, the ratio of the maximum axial distance of a row 19 measured axially between the first and the last blade-like members 17 therein ranges to the diameter of the circumferential regions radially adjacent rotor assembly 14 ranges from about 2.5 to 1 to 15 to 1, and preferably from about 3 to 1 to 10 to 1.

In a preferred configuration, blade-like members 17 in any given row 19 are equally axially spaced from one another. A preferred blade-like member 17 circumferential inclination angle ranges from about 10° to 89° and a most preferred angle is 45° while another such is 30°. While each blade-like member 17 is in the embodiments shown herein, flattened, they may be curved.

While it is presently preferred that each blade-like member 17 have only a one land portion 18, a member 17 may have more than one land portion 31.

The rotor converts mechanical energy to thermal energy by two mechanisms. One is by shearing the melt between the land portion of the blade-like member 31 and the wall of the separation chamber 24. The amount of mechanical energy dissipated in this manner is generally proportional the exposed area of the land portion at constant rotor speed and melt viscosity. The other mechanism of mechanical energy dissopation is by inducing flow and movement in the wave of material pushed ahead of the blade-like member 17.

The circumferential inclination of the blade-like members tends to urge the melt toward the compression chamber 30. The discontinuous extent of the blade-like member 17, promotes radial mixing of the melt and thereby minimizes surging. Foaming is minimized by the combination of the action of the blade-like members 17.

Referring to FIG. 2, it is seen that a row 19 of blades 17 subtends an angle B and that the space between a pair of adjacent rows 19 subtends an angle A relative to side wall portions 16. In this invention, the angle B may be equal to, but not greater than, the angle A to best achieve the high mechanical energy inputs associated with the use of a rotor assembly 14 of this invention in a devolatilizer. In general, a rotor assembly 14 of this invention is adapted to transfer to a viscous (e.g. 5,000 to 5,000,000 centipoises at a shear rate of 10 sec.$^{-1}$ measured at the temperature of devolatilization) liquid being devolatized at least about 30 percent of the total energy input to such liquid in the separation chamber of a devolatizer of the wiped film type. Commonly, the mechanical energy input achieved through the use of a rotor assembly of this invention is over 50 percent of the total energy input to such a viscous liquid and may be as high as 90 percent. Preferably, the rotor provides at least 80 percent mechanical energy input. The total energy input to a viscous liquid being devolatilized is thus provided by a combination of thermal energy input through the walls of the separation chamber of a wiped film devolatilizer plus the mechanical energy input provided by a melt assembly of this invention in any given case.

A presently preferred class of rotor assemblies of this invention comprises the domain wherein each land portion 18 of all blade-like members 17 in one row 19 ends where each land portion 18 of all blade-like members 17 on the next adjacent row 19 begin measured circumferentially.

In FIG. 4 is seen an embodiment of a wiped film devolatilizer incorporating a rotor assembly of the present invention, such devolatilizer being herein designated in its entirety by the numeral 25. Devolatilizer 25 utilizes a housing 26 which in an operative devolatilizer is substantially gas tight and fluid tight. Housing 26 is generally cross-sectionally circular and symmetrical with respect to a common longitudinal axis 27 extending therethrough. Defined within housing 26 at successive adjoining regions along axis 27 are a series of chambers which sequentially comprise an input chamber 28, a vapor separation chamber 29, a compression chamber 30, a pumping chamber 31 and a sealing chamber 32. The housing has defined therein certain apertures. Thus, housing 26 has an input port 33 leading into input chamber 28. A drive shaft entry port 34 is adjacent the sealing chamber 32, though those skilled in the art will appreciate that the drive shaft entry port could be placed at the other end (not shown) of the devolatilizer assembly 25. An output port 35 from pumping chamber 31 is located typically adjacent the sealing chamber 32. A vapor take-off port 36 is located in separation chamber 29, typically and preferably adjacent compression chamber 30.

Within the input chamber 28 and positioned so as to be generally coaxial with axis 27 is a first shaft 40. A splined bushing construction 41 journals shaft 40 for rotational movements and also permits melt material (not shown) during operation of the devolatilizer 25 entering input chamber 28 to pass from port 33 through input chamber 28 and enter into the separation chamber 29 circumferentially about first shaft 40 (see also, for example, FIG. 5A). Thus, in this embodiment sealing means for first shaft 40 is provided by housing 26 itself during operation of the devolatilizer 25 thereby avoiding the necessity for a separate sealing assembly such as is commonly necessary to obtain a fluid seal between a rotating member and a fixed member, as those skilled in the art will appreciate. Additional constructional details for input chamber 28 are given in greater detail hereinafter.

Within separation chamber 29 and located generally coaxially with axis 27 is rotatable rotor assembly, herein designated in its entirety by the numeral 42. Rotor assembly 42 has an axially extending generally enclosed drum 43 with cylindrical side wall portions 44 and an end wall portion 45. End wall 45 is located adjacent input chamber 28. First shaft 40 projects into the vapor separation chamber 29 and interconnects with the end wall portion 45 of drum 43 so that both drum 43 and first shaft 40 are coaxial with axis 27. It will be appreciated that in place of the first shaft 40 within vapor separation chamber 29, one could employ a stub shaft (not shown) on durm 43 which is interconnected with first shaft 40.

A plurality of radially entending, axially projecting rib members 46 are positioned on end wall 45 between shaft 40 and side wall portions 44. Ribs 46 are adapted to deliver material from the region circumferentially located about first shaft 40 to the region circumferentially located adjacent side wall portions 44 of rotor assembly 42.

Integral, radially projecting, blade members 47 are located on side wall portions 44. Blade members 47 terminate in land regions 48 at and in their respective circumferentially located, radial outer edge portions. All individual land regions 48 are substantially equally radially spaced from axis 27. Individual blade members 47 are so arranged on the side wall portions 44 of drum 43 that substantially every inside cylindrical surface portion of housing 26 in vapor separation chamber 29 adjacent said side wall portions 44 is swept by at least one of the land regions 48 during each revolution of rotor assembly 42 during operation of devolatilizer 25.

The rotor assembly 42 during operation of devolatilizer 25 rotates and is adapted thereby to produce simultaneously several different effects. Thus, the rotor assembly 42 is adapted to move melt material through the separation chamber 29 from the input chamber 28 to the compression chamber 30. In addition, rotor assembly 42 is adapted to spread in the form of a thin film (not shown) at least a portion of melt material in the separation chamber 29 over inside cylindrical surface portions of housing 26 in separation chamber 29. Finally, rotor assembly 42 is adapted to produce co-current movement of vapors (which have escaped from melt material) and melt material in the separation chamber 29 as the melt material courses through separation chamber 29 to vapor take-off port 36.

Generally positioned within compression chamber 30 and genrally coaxial with axis 27 is a compression screw 50. Compression screw 50 has a shaft portion 51 whose diameter is so related to the inside diameter of housing 26 in the region of compression chamber 30 along the axial length thereof that the radial distance 52 between shaft portion 51 and the inside cylindrical surface portions of housing 26 in the region of compression chamber 30 generally continuously declines along axis 27 proceeding in a direction from separation chamber 29 towards pumping chamber 31. Shaft portion 51 adjacent separation chamber 29 is integral with the side wall portions 44 of drum 43.

Peripherally located, circumferentially extending, and radially projecting is a helical rib 53 which is integral with shaft portion 51. The width of rib 53 in a radial direction is such as to bring the peripheral outside edge portion or land area of rib 53 proximately to the inside cylindrical surface portions of housing 26 in the region of compression chamber 30. The compression screw 50 is thus adapted to collect, compress and convey melt material from separation chamber 29 to pumping chamber 31 during operation of devolatilizer 25.

Generally positioned within the pumping chamber 31 and generally coaxial with axis 27 is a pump screw 55. Pump screw 55 is of conventional design and is adapted to pressurize and convey melt material from compression chamber 30 to melt output port 35. Pump screw 55 adjacent compression chamber 30 is integral with shaft portion 51.

Generally positioned within sealing chamber 32 and generally coaxial with axis 27 is a second shaft 57.

Bearing or journal means 58 generally associated with sealing chamber 32 journals and mounts second shaft 57 for rotational movement axially. Adjacent pumping chamber 31, second shaft 57 is integral with pump screw 55.

Generally associated with sealing chamber 32 and adapted to make sealing engagement between second shaft 57 and housing 26 during operation of devolatilizer 25 is a conventional type viscoseal screw assembly 59, though those skilled in the art will appreciate that any conventional sealing means can be used here to achieve sealing engagement between second shaft 57 and housing 26.

Thus, in devolatilizer 25, there is a screw assembly comprising first shaft 40, rotor assembly 42, compression screw 50, dumping screw 55 and second shaft 57. To rotatably drive this screw assembly, power transfer means is provided. In the embodiment shown, such means is provided by short shaft 61 which drives second shaft 57 in a drive such that the screw assembly moves melt material from input port 33 to product output port 35 within housing 26. In turn, shaft 61 is driven by transmission 62, transmission 62 itself being operated by electric motor 63.

Figure 5B:
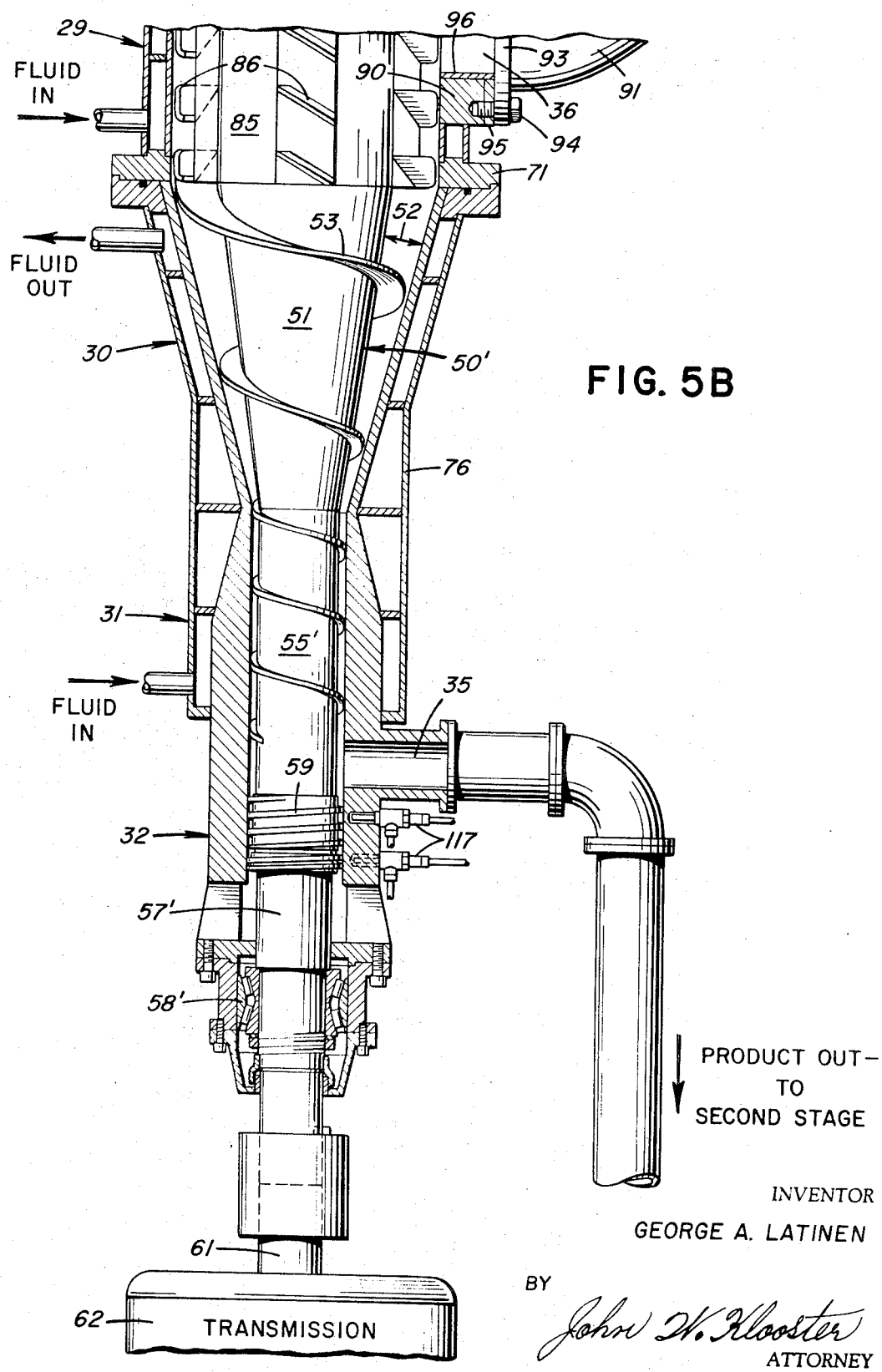

Referring to FIGS. 5A and 5B, there is seen a detailed view of devolatilizer 25, but equipped with an alternative rotor assembly which is herein designated in its entirety by the numeral 85. For reasons of constructional convenience, it is convenient to manufacture housing 26 in the form of subassembly sections which are assembled together to form completed housing 26. In the region of vapor separation chamber 29, typical section 65 of housing 26 is seen to be of double walled cylindrical construction, there being an interior cylindrical wall 66 and an outer cylindrical wall 67. The walls 66 and 67 are maintained in fixed predetermined spaced relationship one to the other by means of spacer members 68.

One end of section 65 ends in a male flange member 70, while the other end thereof ends in a female flange member 71. In the flat facing portion of flange 70, a circular groove 72 is provided for receipt of a seal 73. Thus, in an assembled housing 26, flanges 70 and 71, one each on abutting sections 67 (paired), matingly engage into a sealed relationship between one another by means of seal 73.

It will be appreciated that a devolatilizer 25 is conveniently formed of steel with individual pieces being welded or clamped together. Thus, adjacent sections 65 are conveniently secured together by clamping means, welding, or the like.

The flanges 70 and 71 on a pair of abutting sections 65 may be conveniently secured together by C-clamps, nut and bolt assemblies, or the like (not shown). Section 65 is conveniently constructed so that innercylindrical wall 66 and outer-cylindrical wall 67 are in fluid tight relationship to one another, in cooperation with flanges 70 and 71 and spacer members 68 so that an appropriate heating or cooling fluid (not shown) can be circulated in the open spaces of a section 65 between walls 66 and 67, thereby to heat or cool a section 65 in a controllable manner. Typically, when a devolatilizer 25 is being used with a polymer melt, a section 65 is maintained in a heated condition relative to the surrounding ambient embodiment, the heating being accomplished by using heated water, oil, or the like, as those skilled in the art appreciate. Such a temperature controlling fluid is conveniently injected into a section 65 through an input nozzle 37 and removed therefrom through an output nozzle 38.

In order to control the temperature of the melt material passing through a devolatilizer 25, it is also desirable to jacket housing 26 in the regions of input chamber 28, compression chamber 30, and pumping chamber 31. Typically, in a devolatilization operation being performed on a polymer in devolatilizer 25, these chambers, like separation chamber 29, are maintained in a heated condition. Thus, input chamber 28 is equipped with jacket assembly 75 and compression chamber 30 and pumping chamber 31 are equipped with jacket assembly 76. Flow paths for fluids into and from jackets 75 and 76 are indicated. Conveniently located, in proximity to a devolatilizer 25 when a heating fluid is employed is apparatus (not shown) for heating such a temperature control fluid and for maintaining such fluid at a predetermined feed temperature to devolatilizer 25, as those skilled in the art will fully appreciate. Because of the possibility of excessive heat buildup in an operating devolatilizer 25 in the region of sealing chamber 32, suitable cooling means for this chamber 32 is preferably provided, such as by cold fingers 117, for which refrigeration apparatus (not shown) for cooling a coolant (not shown) and for maintaining such coolant at a predetermined feed temperature is provided located in proximity to a devolatilizer 25.

Bridging the region between seapration chamber 29 and input chamber 28 is a cap plate 74 which joins together a first section 65 and a shell 77 which forms the wall of input chamber 28. Shell 77 is jacketed by jacket assembly 75 in the region of input chamber 28. Interior cylindrical wall surfaces of shell 77 are lined by a splined bushing 41, the bushing 41 being conveniently maintained in position by a ring and key assembly 79 (see FIG. 3). Positioned in input chamber 28 so as to be generally coaxial with shell 77 and splined bushing 41 is first shaft 40. When a hot melt (not shown) enters input chamber 28, such passes through and over the axially extending groove spaces 80 existing between shaft 40 and splined bushing 41. Such a melt further serves to lubricate splined bushing 41. Thus, a melt from input chamber 28 is circumferentially fed into vapor separation chamber 29 about first shaft 40.

Those skilled in the art will appreciate that, in place of the splined bushing 41, one can employ any one of a number of different but functionally equivalent mechanical arrangements in order to achieve delivery, as desired, of melt material from input chamber 28 to separation chamber 29 circumferentially of a first shaft 40. In general, any arrangement of elements which will permit one to deliver melt material from an input port through an input chamber to a vapor seapration chamber in a manner so as to be circumferentially located about a rotatable shaft may be used in practicing the present invention.

As a rotor assembly 42 for use in vapor separation chamber 29, one may employ any one of a number of different but functionally equivalent means in order to process melt material in the vapor separation chamber 29, as described. One preferred rotor assembly is seen in the embodiment shown in FIGS. 5A and 5B and is herein designated in its entirety by the numeral 85. In rotor assembly 85, a drum 43 is employed whose side wall portions 44 extend radially outwardly a plurality of discrete blade-like members 86. These blade members 86 are arranged into four axially extending rows. These rows are in circumferentially spaced relationship to one another and each now contains approxiamtely an equal number of blade members 86. Although the embodiment shown utilizes four rows, it will be appreciated that any convenient number of rows can be used from two to about eight, three or four rows presently being preferred. All blade members 86 are circumferentially inclined at an angle between about 10° to 89° with respect to rotor assembly axis 27. In the embodiment shown, each blade member is inclined at a fixed angle of about 30°. Each of the blade members 86 in any given row are generally equally axially spaced from one another. Each blade member 86 has a land portion 87 defined on its circumferentially extending radially outward edge portion. All the land areas of the individual blade members 86 are substantially equally radially spaced from axis 27. In general, the blade-like flattened members 86 are so arranged on side wall portions 44 that substantially all cylindrical regions on the inside walls of seaparation chamber 29 adjacent the side wall portions 44 of drum 43 are swept by at least one land portion 87 during a single rotation of rotor assembly 85. Thus, each point in the separation chamber 27 adjacent side wall portions 44 has both an axial and a circumferential force vector exerted thereon during rotational movements of the rotor assembly 85.

In rotor assembly 85, between blade member 86 and the side wall portions 44 of drum 43 is an axially extending flange 88 which extends axially under each row of blade members 86. Each flange 86 defines a circumferentially rising ramp-like outside face 89 and has a leading edge 114 and a trailing edge 115. Edges 114 and 115 extend axially and are in circumferentially spaced, parallel relationship to one another. The direction of circumferential rise for all outside faces 89 is substantially the same. The number of flanges 88 employed in a given rotor assembly 85 can vary, the nubmer being generally equal to the number of rows of blade members 86 employed in a given rotor assembly 85.

With rotor assembly 85, as shown in FIGS. 5A and 5B, there are employed a compression screw 50 and a pumping screw 55 each of which is like the corresponding members used in the embodiment of FIG. 4 for rotor assembly 42. In FIG. 5B it is seen that a thrust bearing assembly 58 for shaft 57 is employed.

One preferred construction for the region in the vicinity of the vapor take-off port 36 in housing 26 is illustrated by FIG. 5A. Extending through a section 65 is an appropriately shaped mounting flange 90. Connected to flange 90 is an elbow pipe 91 which, at its respective input and output ends, is equipped with respective flanges 92 and 93. Extending through flange 93 to couple elbow pipe 91 to flange 90 are a series of bolts 94 which threadably engage mating threading recesses in flange 90. Positioned between flange 93 and flange 90 is a ring 95 of metal. Connected (as by welding or the like) to the interior circumference of ring 95 is a sleeve 96. Mounted on the inside circumferential surface portion of sleeve 96 are two wedge-shaped flanges 98 which act as baffles to reject melt material within separation chamber 29 which might tend to enter and pass through the vapor take-off port 36 during rotational movements of rotor assembly 85 in operation of devolatilizer 25. While the devolatilizer 25 is operable without flanges 98 since by the present invention there is only slight tendency for melt material to enter through vapor take-off port 36 from vapor separation chamber 29, it will be appreciated that the efficiency of operation of devolatilizer 25 is improved by the presence of flanges 98, or equivalent assembly, in a devolatilizer 25.

Housing 26 as illustrated in FIGS. 5A and 5B in devolatilizer 25 is generally conically shaped in the region of compression chamber 30, being tapered from a maximum diameter adjacent the region of separation chamber 29 to a final minimum diameter adjacent the region of pumping chamber 31. The thickness of housing 26 in the region of pumping chamber 31 is icreased so that housing 26 can withstand the pressures developed here during operation of devolatilizer 25. A single jacket assembly 76 circumferentially embraces housing 26 in the adjoining regions of the compression chamber 30 and the pumping chamber 31.

Figure 6:
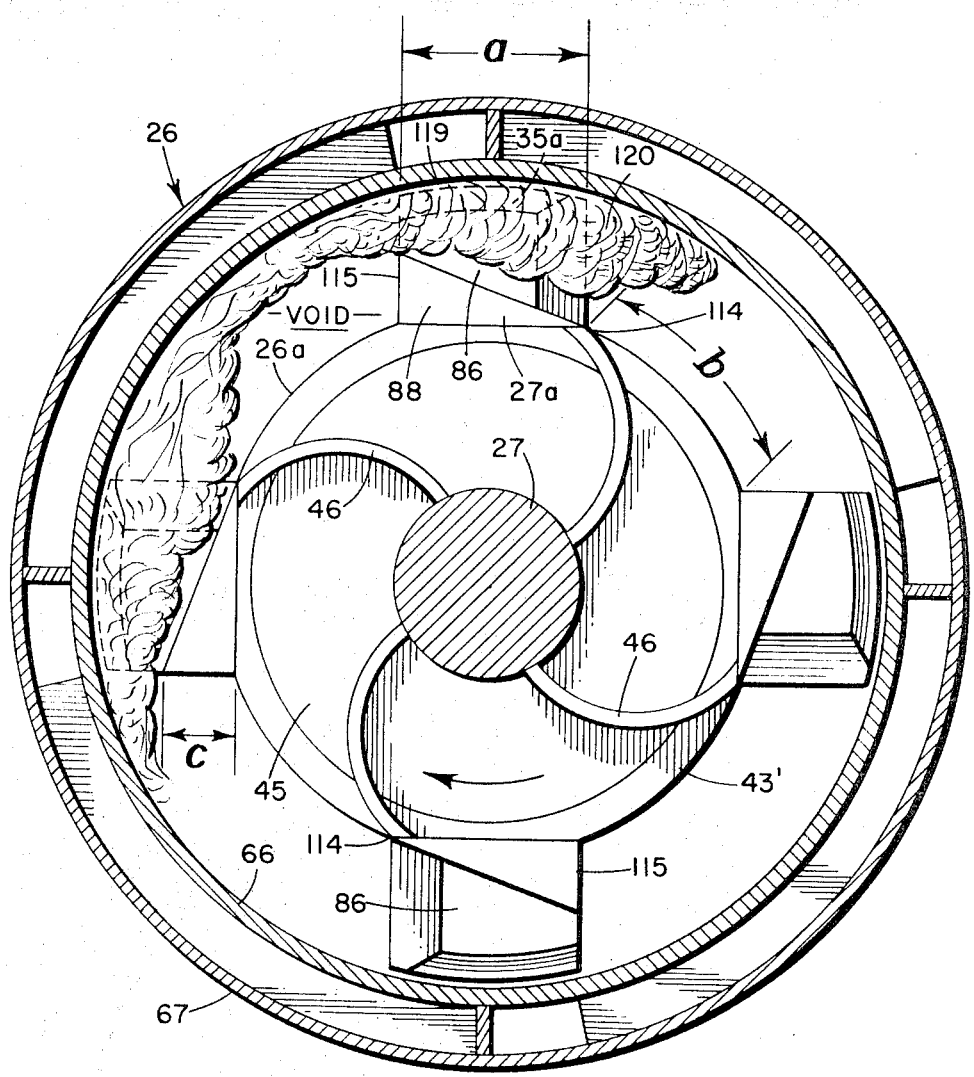
FIG. 6 is a vertical sectional view taken along the line 6—6 of FIG. 5A.

The operation of a rotor assembly, such as rotor assembly 42, in the separation chamber 29 of a devolatilizer 25 is illustrated in FIG. 6. In FIG. 6 is shown the appearance of a melt material as such moves axially through the separation chamber 29. As the melt material moves in the dowwards direction shown, for example, in FIG. 1, such melt material is seen to be distributed in the form of a thin film 119 on the inside cylindrical surface portions of housing 26 within the separation chamber 29. Concurrently, as the rotor assembly 42 turns, a species of wave 120 exists just in front of the land region 48 on each blade member 47. What happens in operation when devolatilizing a relatively viscous liquid as a rotor assembly 85 revolves in a separation chamber is illustrated in FIG. 6. As a viscous liquid passes over a flange 88, a void space 5 is created adjacent the trailing edge of flange 88 behind blade 86, thereby creating a zone where a high liquid surface area exposed to a vapor phase exists, enhancing devolatilization, as those skilled in the art will readily appreciate.

Owing to the fluid mechanical nature of the melt material, in the course of a plurality of revolutions of rotor assembly 42, the melt material comprising a thin film 119 gradually becomes caught up and becomes a part of wave 120, only to be redeposited at a further point on the side wall of housing 26 in vapor separation chamber 29 at a further point on downwardly in the vapor separation chamber 29. The process is gradually repeated for all melt material in vapor separation 29 until all material entering input chamber 28 is expelled through the product output port 35. Typical circumferentially exerted force vectors in film 119 are suggested by the arrows shown adjacent land region 48. In the region immediately adjacent housing 26, very little fluid movement occurs in film 119, but the rate of fluid movement in thin film 119 increases as one moves towards a land region 48.

Although the housing is externally tapered downwardly about compression chamber 30 from a maximum to a minimum cross-sectional diameter in the region of pumping chamber 31, such a taper is not necessary in order to practice the present invention. Thus, for example, one may employ a housing whose cross-sectional diameter substantially is constant through the various chambers.

From the foregoing description, it will be appreciated that a rotor assembly of this invention may be used in a separation chamber regardless of how melt material is fed thereto, how melt material and vapor evolved therefrom flow through a separation chamber, how melt is collected and/or compressed after traversing a separation chamber, or the like. For example, material which flows through a separation chamber may be vertical (upwards or downwards), horizontal, or the like.

It will be appreciated that, while the embodiments of the present invention, as shown and described herein are necessarily limited to a few forms of the present invention, many variations and modifications thereof are feasible and practical without departing from the spirit and scope of the present invention disclosed and claimed herein.

What is claimed is:

1. A rotor assembly adapted for use in a wiped film co-current devolatilizer for processing relatively viscous materials and separating the volatiles therefrom comprising:
   A. a rotably mountable shaft means having generally circularly symmetrical side wall portions,
   B. a plurality of radially outwardly extending, blade-like members on said side wall portions,
      1. each such blade-like member extending circumferentially at an angle ranging from about 10° to 89° with respect to the axis of said shaft means, all such blade-like members having a similar inclination,
      2. all such blade-like members being arranged into at least three axially extending, circumferentially spaced, parallel rows, each such row containing about the same number of such blade-like members, the blade-like members in each such row being axially spaced from one another,
      3. each blade-like member having a land portion defined at its radial outer, circumferentially located edge, each such land portion being substantially equally radially spaced from said axis, and being adapted to apply both an axial and a circumferential force vector on said viscous material when said rotor assembly revolves on said axis,
      4. said blade-like members being so located on said side wall portions that all circumferential regions radially adjacent said rotor assembly are swept by at least one land portion during one revolution of said rotor assembly on said axis,
      5. said blade-like members being further so arranged on said side wall portions that the end of a land portion on one blade-like in one row generally either meets or overlaps less than 100 percent upon the beginning of a land portion on another blade-like member in the next adjacent row measured circumferentially in the direction of rotation of said rotor assembly on said axis,
   C. the ratio of the sum of the surface areas of all said land portions to the sum of all circumferential regions radially adjacent said rotor assembly swept by said land portions in one revolution of said rotor assembly ranging from about 0.003 to 1 to 0.15 to 1,
   D. the ratio of the diameter of said shaft means to the diameter of the circumferential regions radially adjacent said rotor assembly ranging from about 0.3 to 0.9,
   E. the ratio of the maximum axial distance of a said row between the first and the last blade-like members therein to the diameter of the circumferential regions radially adjacent said rotor assembly ranging from about 2.5 to 1 to 15 to 1.

2. The rotor assembly of claim 1 wherein said blade-like members are substantially parallel to one another.

3. The rotor assembly of claim 1 wherein said rows are substantially equally circumferentially spaced from one another.

4. The rotor assembly of claim 1 wherein said blade-like members are substantially equally axially spaced from one another in each row.

5. The rotor assembly of claim 1 wherein the number of said rows is four.

6. The rotor assembly of claim 1 wherein the rotatably mounted shaft means has generally cylindrical side wall portions.

* * * * *